(12) United States Patent
Liu et al.

(10) Patent No.: US 7,361,324 B2
(45) Date of Patent: Apr. 22, 2008

(54) PRECIPITATED CALCIUM CARBONATE

(75) Inventors: Sung-Tsuen Liu, Aberdeen, MD (US); Michael Robert Hart, Bel Air, MD (US)

(73) Assignee: J. M. Huber Corporation, Edison, NJ (US)

( * ) Notice: Subject to any disclaimer, the term of this patent is extended or adjusted under 35 U.S.C. 154(b) by 347 days.

(21) Appl. No.: 10/872,903

(22) Filed: Jun. 21, 2004

(65) Prior Publication Data

US 2005/0281728 A1 Dec. 22, 2005

(51) Int. Cl.
*C01F 11/18* (2006.01)

(52) U.S. Cl. ...................... 423/432; 106/464
(58) Field of Classification Search ............... 423/461, 423/165, 432; 106/464
See application file for complete search history.

(56) References Cited

U.S. PATENT DOCUMENTS

| 3,920,800 | A | 11/1975 | Harris |
| 5,075,093 | A | 12/1991 | Tanaka et al. |
| 5,342,600 | A | 8/1994 | Bleakley et al. |
| 5,643,415 | A | 7/1997 | Wise |
| 5,833,747 | A | 11/1998 | Bleakley et al. |
| 5,879,442 | A * | 3/1999 | Nishiguchi et al. ......... 106/464 |
| 6,500,400 | B1 | 12/2002 | Kinnen et al. |
| 2006/0099132 | A1* | 5/2006 | Erdman ...................... 423/432 |

FOREIGN PATENT DOCUMENTS

| EP | 1151966 A1 | | 7/2001 |
| JP | 61219715 A | | 3/1985 |
| JP | 01118692 A | | 10/1987 |
| JP | 01119512 A | | 10/1987 |
| JP | 01246129 A | | 2/1988 |
| JP | 03115120 A | | 6/1990 |
| JP | 403040896 A | * | 2/1991 |
| JP | 06040717 A | | 7/1992 |

* cited by examiner

*Primary Examiner*—Wayne A. Langel
*Assistant Examiner*—James Fiorito
(74) *Attorney, Agent, or Firm*—David Mitchell Goodrich

(57) ABSTRACT

A method for forming calcium carbonate is provided, the method comprising the steps of: (a) milling calcium hydroxide; (b) providing a reactor vessel containing a slurry of the milled calcium hydroxide; and (c) carbonating the slurry of the milled calcium hydroxide by introducing carbon dioxide into the reactor vessel to form basic calcium carbonate by a precipitation reaction, wherein the initial reaction temperature is from about 8° C. to about 15° C.

7 Claims, 3 Drawing Sheets

US 7,361,324 B2

PRECIPITATED CALCIUM CARBONATE

BACKGROUND OF THE INVENTION

Precipitated calcium carbonates find use in a broad range of manufactured and consumer products ranging from paper and paper coatings to plastic and elastomer reinforcement to food supplements and cosmetics. Calcium carbonate is particularly useful in paper coatings, because it is relatively inexpensive and imparts good optical performance characteristics to paper resulting in a brighter, glossier more opaque paper, while also providing a high resistance to yellowing and aging.

PCC can be cleanly and conveniently produced in a precipitation reaction by reacting aqueous calcium hydroxide, $Ca(OH)_2$ (also known as "milk of lime" or "MOL") with carbon dioxide ("carbonation") with water being generated as a by-product. Under certain reaction parameters, such as reaction temperature of 8° C. to 15° C., this precipitation reaction may produce "basic calcium carbonate" that, if desired, can be used as precursor for further conversion to forms of calcium carbonate, such as calcite, by further carbonation. Basic calcium carbonate is a desirable form of the material because it has a "platy" structure that is especially good at imparting desirable functional properties such as high gloss, whiteness and opacity when prepared as part of a paper coating.

It is often desired to produce precipitated calcium carbonate in specific forms and particle sizes such as the small particle size calcite form. Calcite has a trigonal crystalline form with crystal habits such as scalenohedral, rhombohedral, hexagonal prism, pinacoid, and cubic, and prismatic. These particular morphologies are important because the coating properties, such as light scattering, of a calcium carbonate material are strongly correlated to its morphology and particle size. Prismatic and rhombohedral-shaped PCC have maximum light scattering at 0.4 to 0.5 µm sized particles, while scalenohedral-shaped PCC has maximum light scattering of 0.9 to 1.5 µm particles. The aforementioned small-shaped sized, rhombohedral morphology makes the material particularly effective for use in a paper coating composition.

Given the forgoing there is a continuing need for calcium carbonate materials that impart excellent optical performance properties to paper when included in a paper coating composition. Such calcium carbonate materials should preferably be in a crystal form that is most likely to enhance such optical performance, and have other characteristics such as particle size and particle size distribution that further enhance the optical performance of paper.

BRIEF SUMMARY OF THE INVENTION

The present invention includes a method for forming calcium carbonate comprising the steps of: (a) milling calcium hydroxide; (b) providing a reactor vessel containing a slurry of the milled calcium hydroxide; and (c) carbonating the slurry of the milled calcium hydroxide by introducing carbon dioxide into the reactor vessel to form basic calcium carbonate by a precipitation reaction, wherein the initial reaction temperature is from about 8° C. to about 15° C.

The present invention also includes a method for forming rhombohedral calcium carbonate comprising the steps of: (a) providing a reactor vessel containing a calcium hydroxide slurry; (b) carbonating the calcium hydroxide by introducing carbon dioxide into the reactor vessel to form basic calcium carbonate by a precipitation reaction, wherein the initial reaction temperature is from about 8° C. to about 15° C.; (c) terminating the introduction of carbon dioxide described in step (b) and milling the basic calcium carbonate; and (d) carbonating the milled basic calcium carbonate to form rhombohedral precipitated calcium carbonate.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
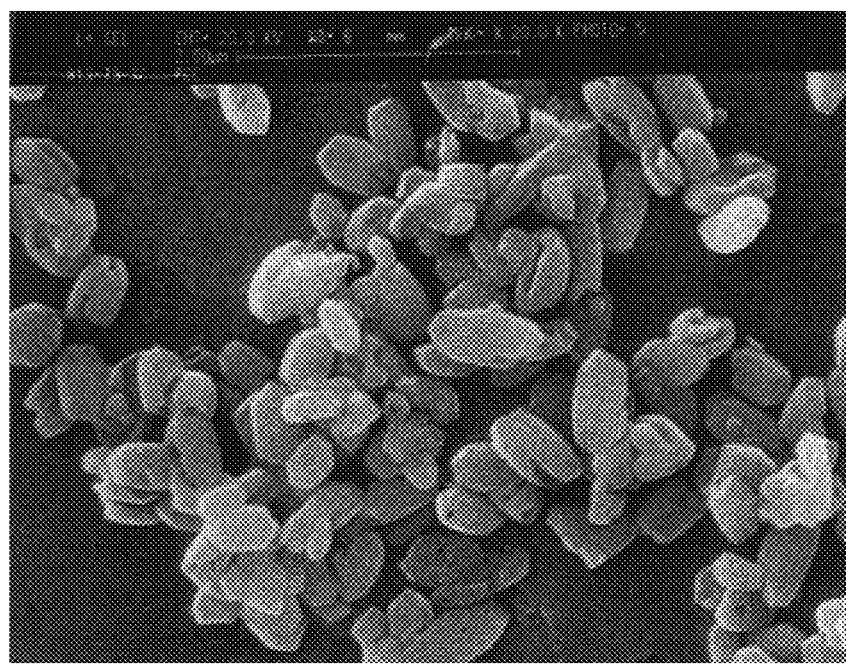
FIG. 1 is a SEM photomicrograph of the rhombohedral PCC prepared from milled lime slurry as in Example 3, showing r-PCC primary particles having a size of about of 0.4-0.8 µm.

The present invention relates to methods for preparing precipitated calcium carbonate materials, particularly precipitated calcium carbonate compositions in rhombohedral form (r-PCC), and basic calcium carbonate (BCC) in platy form which impart improved optical performance characteristics when included within a paper coating composition. Because these precipitated calcium carbonate materials have a small particle size, as well as a narrow particle size distribution they are particularly useful for formulating paper coating composition having a high opacity and gloss performance.

Precipitated calcium carbonate is obtained by exposing calcium hydroxide (i.e., milk of lime or slaked lime) to a carbonation reaction. This may be done by injecting carbon dioxide gas into a reaction vessel containing aqueous calcium hydroxide slurry.

Methods and techniques for preparing these precipitated calcium carbonates are discussed in greater detail in U.S. Pat. Nos. 4,888,160, 2,081,112, and 2,058,503.

In the present invention the techniques for preparing precipitated calcium carbonate are modified according to the present invention in order to produce the preferred basic calcium carbonate (BCC) and rhombohedral precipitated calcium carbonate (r-PCC) in the desired particle size, particle size distribution and morphology. The techniques may be modified in two different ways according to the present invention. In the first modified method, the material was prepared according to the present invention with a step of pre-milling the slaked lime before the carbonation reaction even began. The milling of the slaked lime should be accomplished through wet milling by any mill known in the art, preferably by a horizontal or vertical media or bead mill, such as a Premier Mill, such that median particle size of the milled slaked lime is less than 5 microns, preferably less than 3 microns, and most preferably less than 2 microns.

After being milled in this fashion, the carbonation reaction was begun at a temperature of 5-15° C. The reaction pH and conductivity were monitored during the entire reaction. After approximately two-thirds of the total reaction time, the reaction conductivity dropped, which indicated the Basic Calcium Carbonate ($2CaCO_3 \cdot Ca(OH)_2 \cdot H_2O$) had formed. (The actual length of time for the conductivity drop depends on batch variables such as the batch size, reactant concentrations, addition rates, lime purity and reactivity and the like.) At this point, the BCC can be collected by filtration and drying or collected as a slurry for use in a paper coating. BCC produced according to the present invention has a primary particle size of about 0.2-0.8 μm, while BCC produced from un-milled slaked lime has a primary particle size of about 1-2 μm.

Alternately, the carbonation reaction can proceed until there is a final drop in conductivity and the reaction pH drops to about pH 6 to about pH 7, indicating r-PCC has formed. The r-PCC is collected by filtration and drying or collected as a slurry for use in a paper coating. R-PCC produced according to the present invention has a median particle size of about 0.2 to about 1 μm, while R-PCC produced from unmilled slaked lime has a median particle size of about 2 μm. The particle size distribution (as measured by the 75/25 particle size distribution slope, described below) was between about 1.7 to about 1.8.

In the case of this method, it is believed that the grinding of the slaked lime affects the lime dissolution rate and thus the nucleation rate of the calcium carbonate precipitation reaction. Therefore, the milling of the slaked lime tends to produce finer calcium carbonate and basic calcium carbonate particles.

As mentioned above, the rhombohedral form is particularly effective in imparting good optical performance (e.g., increasing the light scattering coefficient). Furthermore, it has been noted that for precipitated calcium carbonate having a rhombohedral morphology, there is an inverse relationship (within certain particle size ranges) between optical performance and particle size—smaller particle sizes leads to better optical performance. Additionally, it is preferred that this precipitated calcium carbonate have a narrow particle size distribution that results in a paper or coating structure that is a more efficient scatterer of light and, thus imparts enhanced optical performance properties, particularly opacity and gloss to paper products.

The second modified method is somewhat different. Basic calcium carbonate ("BCC") is prepared by known precipitation techniques, at a temperature of about 8° C. to about 15° C., such as those described above and in H. Yamada, Journal of Pulp and Paper Technology Society Japan, 44, pages 62-69 (1990) and H. Yamada, Gypsum and Lime, 196 (1985), but with an additional step of milling the BCC after its formation, and then continuing the carbonation of the milled BCC until it has converted into rhombohedral precipitated calcium carbonate ("r-PCC"). Alternately, the BCC can be collected after milling, but before further carbonation for use in a paper coating composition. This milling of the BCC can be conveniently accomplished through wet milling by any mill known in the art, preferably by a horizontal or vertical media or bead mill, such as a Premier Mill. The primary particle size of the platy-shaped BCC before milling was between about 1 μm and 2 μm in diameter and about 0.18 μm in thickness and after milling was 0.4 to 0.8 μm in diameter and about 0.1 μm in thickness, as visually determined from an SEM photomicrograph. When the milled BCC is further carbonated to form r-PCC, the median particle size of the final r-PCC material prepared by this method is between about 0.5 to 1 μm and the primary particle size is less than about 1 μm, preferably about 0.1 to about 0.8 μm. This is compared to r-PCC formed from unmilled lime which has a median particle size of about 2 μm and a primary particle size of about 1-2.5 μm. The particle size distribution (as measured by the 75/25 particle size distribution slope, described below) was about 1.7.

The BCC and r-PCC materials prepared according to either of the aforementioned methods are suitable for use in many applications but as discussed above they are particularly useful as an ingredient in paper coating compositions. Paper coating compositions typically have several different ingredients including, pigments (e.g., the presently described BCC and r-PCC as well as other materials like clays, and other mineral particulates), starches, lubricants, plasticizers, dispersants, defoamers, etc.

Test Methods

Median Particle size is measured with a Sedigraph 5100 available from Micromeritics Corporation, Norcross, Ga., unless otherwise indicated. This is a sedimentation type instrument, which uses Stokes Law in determining the equivalent spherical particle diameters (ESD). The use of such equipment to determine particle size is well within the capabilities of a person of ordinary skill in the art.

Primary particle size was estimated by visually comparing the sizes of particles to a micron marker on a SEM photomicrograph taken at 20 k magnification. Individual particles are attached to one another to form aggregates. It is the size of the individual particles that is recorded.

The particle size distribution, or "slope" for purposes of this disclosure, is defined as the quotient of the equivalent spherical diameter (ESD) value for which 75% of the particles are less than (as the numerator), divided by the equivalent spherical diameter value for which 25% of the particles are less than (as the denominator), and with the particle sizes measured by a Micromeritics Sedigraph 5100 X-ray sedimentation type instrument, which uses Stokes Law in determining the equivalent spherical particle diameters. Hence, a PCC coating pigment that has 75% of its particles <0.85 microns and 25% of its particles <0.50 microns would therefore have a 75/25 slope value of 0.85/0.50=1.7.

The scattering coefficient was determined on a slurry of PCC coated onto a Mylar sheet by first forming a 48.8% solids slurry of PCC in water. To this slurry was added 25 g of Dow CP620NA latex (Dow Chemical, Midland, Mich.) and the resulting slurry was mixed with a low shear mixer (Lighnin mixer fitted with a marine impeller) for 5 minutes. The pH of the slurry was adjusted to above 8.5 with ammonium hydroxide. Rohm and Haas (Philadelphia, Pa.) Acrysol ASE-60 thickener was added to adjust the Brookfield viscosity to 800 to 1500 centipoise utilizing a Brookfield Model RVT, while maintaining the pH above 8.5, adding ammonium hydroxide as necessary. If the mixture contained many air bubbles, it was screened through a US 200 mesh screen (75 μm). Next a roll of Type A 2-mil thick Mylar film (Macon Bluprint Company, Macon, Ga.) was placed in the dispensing position of a Precision film coater available from Precision Gage and Tool Company, Dayton, Ohio. A 3, 4, or 5 mil spacer was sequentially attached to provide about a 10, 20 or 30 g/m² coating weight, respectively, to the Mylar sheet. (Three separate coatings having different thicknesses were applied to 3 separate Mylar sheets utilizing the aforementioned spacers). The roller assembly, Mylar film and coating well were aligned and then the Mylar sheet was coated utilizing 10 cc syringe to fill the coating well with the prepared PCC-latex slurry. Two 2-3-foot strips of Mylar were coated within 30 seconds of each other and the coated strips were hung and air dried for 30 minutes and then conditioned for at least 1 hour in a constant temperature (21° C.) and 50% relative humidity environment. A sample of uncoated Mylar was treated in the same manner for comparison. Ten 5-inch strips were cut from the uncoated and coated (no large uncoated areas visible) Mylar samples. Each strip was weighed to the nearest 0.001 g and used to calculate the net coating weight. Standard optical measurements were made on the coated strips using a Technidyne BNL-3 Opacimeter and scattering coefficients determined using Kubelka-Munk were calculated.

Basis weight, g/m²=(Average weight of strip, g/m²) (206.59)

Net coat weight=(Basis weight coated strip)−(basis weight uncoated strip)

The invention will now be described in more detail with respect to the following, specific, non-limiting examples.

EXAMPLES

Several examples of r-PCC material were prepared according to the present invention, as well as a few comparative samples for control purposes. Along the lines set forth above, these examples can be divided into two groups.

In these examples, there is a 2-step process to produce the PCC of Examples 1-3. First, burnt lime is slaked and milled and second the slaked, milled lime is carbonated, first partially carbonated to BCC, then fully carbonated to PCC. The reactions are given below.

$$CaO+H_2O \rightarrow Ca(OH)_2 \text{ (slaking)}$$

$$3Ca(OH)_2+2CO_2 \rightarrow 2CaCO_3 \cdot Ca(OH)_2 \cdot 1.5H_2O + 0.5H_2O \text{ (BCC)}$$

$$2CaCO_3 \cdot Ca(OH)_2 \cdot 1.5H_2O+CO_2 \rightarrow 3CaCO_{3+2.5}H_2O \text{ (PCC)}$$

Lime was slaked prior to use as a reactant to produce basic calcium carbonate and precipitated calcium carbonate in a 5-gallon plastic pail equipped with an Arrow 850 mixer (Arrow Engineering Company, Hillside, N.J.) fitted with dual 2.5-inch marine impellers. First, 7.00 g citric acid was dissolved in 13,784 g of tap water in the pail. Thereafter, 2300 g of calcined lime (CaO) available from Beachville Lime Limited, Ontario, Canada was added in 3 portions (1000 g, 1000 g and 300 g) with mixing (mixer set to 5) to provide a 6:1 ratio of $H_2O$: lime. The temperature of the water before adding the lime was about 25-30° C. and after the lime was slaked (exothermic reaction) the temperature of the milk of lime slurry rose to about 65-70° C. Unreacted lumps of lime were removed from the slaked lime slurry by pouring the slurry onto a 24-inch Sweeco vibrating screen (Sweeco, Inc., Florence, Ky.) equipped with a 325-mesh screen (45 μm).

The slaked lime prepared above containing about 18% solids was split into 3 equally sized lots and each lot separately milled under the conditions in Table 1 below before being used as a reactant to produce BCC and PCC. The slaked lime had a median particle size (MPS) of 7.4 μm before milling. A horizontal Premier bead mill, model HML-1.5, having a 1.5 liter grinding chamber was loaded with 1.2 liters (80% by volume) of 0.6-1.0 mm sized zirconia media beads having a specific gravity of 3.7. Example 1 was mildly milled; Example 2 was medium milled; and Example 3 was vigorously milled.

TABLE 1

Slaked Lime Milling Conditions

| Example | No. passes | FPM | Retention time (seconds) | MPS μm |
|---|---|---|---|---|
| Unmilled Lime Control | 0 | 0 | 0 | 7.4 |
| 1 | 1 | 1650 | 30 | 2.8 |
| 2 | 1 | 2000 | 60 | 1.7 |
| 3 | 2 | 2000 | 60 | 0.9 |

The median particle size (MPS) of the lime samples given in Table 1 was determined using a Model LA-910 laser light scattering instrument available from Horiba Instruments, Boothwyn, Pa.

Next, BCC then PCC were prepared from each of the respective milled lime samples prepared above along with a control prepared from lime that was not pre-milled. For these examples, 300 g of milled lime slurry (anhydrous lime basis) at 16.7% solids was diluted with ice and water to 9% solids to a temperature of about 9-11° C. in a 1-gallon reactor equipped with an Arrow 1750 mixer fitted with 6-inch paddle blades. The mixer speed was set to 5 and $CO_2$ gas and air were introduced through a perforated distribution ring submerged in the lime slurry at a rate of 1.275 LPM and 3.75 LPM, respectively. Tubing delivering the $CO_2$ and air were connected with a "T" to join the flows before connecting to the distribution ring. The conductivity and pH of the batch were continuously monitored to gauge the different stages of the reaction. The absolute conductivity values generally vary from batch to batch, but there is a decrease in conductivity about ⅔ through a batch indicating BCC is formed. (A sample of the BCC was collected, dried and analyzed by SEM for morphology and primary particle size, with results provided in Table 2 below.) The conductivity decreases again at the end of the batch indicating completion of the reaction of BCC, calcium hydroxide and carbon dioxide to form precipitated calcium carbonate. Conductivity was monitored using a chart recorder, since it was easier to visualize these drops.

The resultant PCC was filtered on a Buchner funnel and a portion of the filter cake was dried. SEM photomicrographs of the dried PCC confirmed that all 3 examples had a rhombohedral morphology. The filter cake was evaluated for several properties which are summarized in Table 2.

TABLE 2

| | Properties | | | |
|---|---|---|---|---|
| | BCC | R-PCC | | |
| Example | Primary Particle Size μm | Primary Particle Size μm | MPS, μm | 75/25 |
| control | 1.2-2 × 0.18 | 1-2.5 | 2.06 | 1.94 |
| 1 | 0.4-0.8 × 0.12 | 0.7-1.25 | 0.91 | 1.71 |
| 2 | — | 0.65-1.1 | 0.82 | 1.77 |
| 3 | — | 0.4-0.75 | 0.61 | 1.76 |

Figure 2:
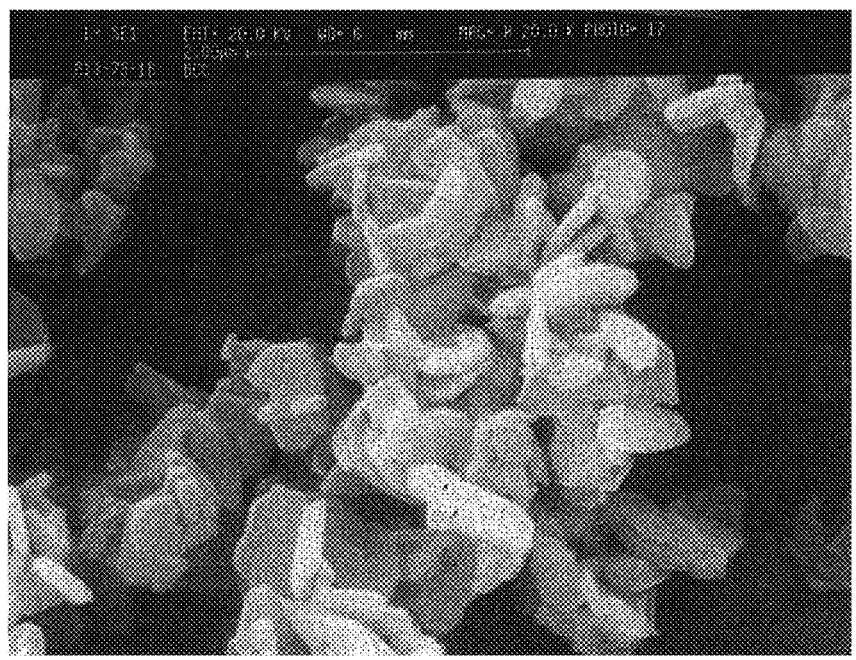
FIG. 2 is a SEM photomicrograph of the basic calcium carbonate prepared from milled lime slurry as in Example 1, showing a primary particle diameter of about 0.4 µm to about 0.8 µm and a thickness of about 0.12 µm.
Figure 3:
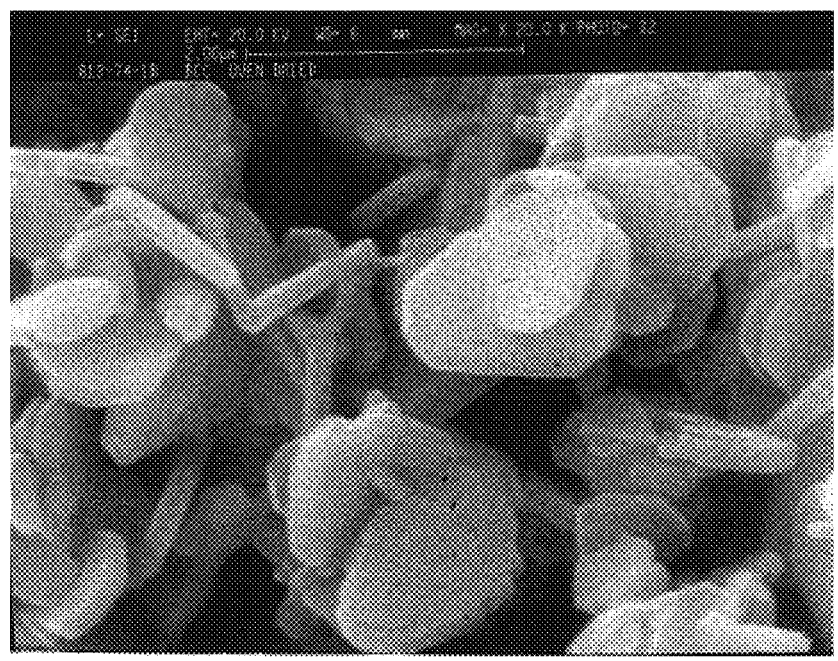
FIG. 3 is a SEM photomicrograph of basic calcium carbonate prepared as control for Examples 1-3 from unmilled lime slurry, showing BCC having an primary particle size of about 1.2-2 µm.

As can be seen in Table 2, r-PCC material which is prepared according to the present invention, by pre-milling the slaked lime before the carbonation reaction, showed smaller particle sizes than the comparative control calcium carbonate material which was prepared without any step of pre-milling the slaked lime. The difference in primary particle size is further illustrated in the figures. FIG. 3 is an SEM of photomicrograph of basic calcium carbonate prepared as control for Examples 1-3 from unmilled lime slurry, showing BCC having an primary particle size of about 1.2-2 μm. FIG. 2 is a SEM photomicrograph of the basic calcium carbonate prepared from milled lime slurry as in Example 1, showing a primary particle diameter of about 0.4 μm to about 0.8 μm and a thickness of about 0.12 μm. FIG. 1 is a SEM photomicrograph of the rhombohedral PCC prepared from milled lime slurry as in Example 3, showing r-PCC primary particles having a size of about of 0.4-0.8 μm. These figures illustrate that carbonating milled lime slurry produces smaller particle size BCC and r-PCC than carbonating the control unmilled lime. Such smaller particle size means that the material will impart better optical performance to paper when the material is included in a paper coating composition. Similarly, the r-PCC material which is prepared according to the present invention, by pre-milling the slaked lime before the carbonation reaction, showed a more narrow particle size distribution (i.e., the particle size distribution number was smaller, see the discussion of this measurement, above) than the comparative control calcium carbonate material which was prepared without any step of pre-milling the slaked lime. Such narrower particle size distribution means that the material will impart better optical performance to paper when the material is included in a paper coating composition.

Examples 4-6

In these examples, the lime slurry was not pre-milled as in Examples 1-3. Instead, the reaction was paused after the BCC formed, so that the BCC could be milled before the reaction was continued to make r-PCC.

Lime was slaked as above except there was no pre-milling step. Then, the quantity of lime slurry which provided 2200 g of $Ca(OH)_2$ on a dry basis was placed in a 5-gallon reactor with ice and water. The lime slurry used was about 18.5% solids and between about 40 and 50° C. Ice was used to cool the reaction to less than 15° C. before carbonation began. Actual parameters for these examples are provided in Table 3 below. The Arrow 1750 mixer is turned on to speed setting 4, then $CO_2$ gas and air in a 1:1 ratio were introduced into the reactor (tubing joined with a "T" as in earlier examples) through a perforated distribution ring. Conductivity, pH and temperature were monitored for the duration of the batch.

TABLE 3

PCC Reactants

| Example | Lime slurry % solids | Lime, g | Ice, g | $H_2O$, g | Initial Temp, ° C. |
|---|---|---|---|---|---|
| 4 | 18.75 | 11,733 | 4500 | 2100 | 11 |
| 5 | 18.79 | 11,708 | 5200 | 1425 | 10 |
| 6 | 18.46 | 11,918 | 4200 | 2215 | 10 |

At the first drop in conductivity, BCC had formed. For examples 5 and 6, the reaction was stopped at this point and the BCC was collected and milled in the Premier mill described above (same beads and bead loading) and under the conditions given in Table 4. Example 4 was a control where the batch was continued until the second conductivity drop indicating PCC had formed, with no intermediate milling step of the BCC formed.

TABLE 4

BCC Milling Conditions

| Example | Milling | FPM | No. passes | Retention Time (seconds) |
|---|---|---|---|---|
| 4 | None | — | — | — |
| 5 | Mild | 1650 | 1 | 30 |
| 6 | Strong | 2000 | 2 | 60 |

After the BCC was milled (Examples 5 and 6) it was put back into the reactor and the reaction resumed by restarting the addition of carbon dioxide and air. When the conductivity dropped again, the reaction was finished, however the pH was still high. $CO_2$ and air were continued until the batch pH dropped below 7. The resultant PCC was collected by filtration on a Buchner funnel and then oven dried at 105° C. overnight. Table 5 summarizes the Example 5 batch profile showing the parameter values at different stages of the reaction.

TABLE 5

Example 5 Batch Profile

| Time (min) | Stage | Temperature ° C. | Conductivity μS | pH |
|---|---|---|---|---|
| 0 | Initial | 11 | 8.1 | 12.5 |
| 46 | BCC reaction start | 24 | 6.4 | 12.4 |
| 78 | | 32 | 5.5 | 12.3 |
| 97 | BCC reaction done | 37 | 1.9 | 12.1 |
| | BCC is then milled | | | |
| 0 | Restart reaction | 32 | 6.1 | 12.1 |
| 24 | PCC formation start | 35 | 3.4 | 12.1 |
| 49 | PCC formation done | — | — | — |
| 70 | Batch stopped | 39 | 1.6 | 6.7 |

It is seen in the profile of Example 5 in Table 5 that the total batch reaction time was 146 minutes and that there are 2 distinct drops in conductivity during the batch. The first conductivity drop occurs at 97 minutes or at about ⅔ of the total batch time. The second conductivity drop occurs at the end of the PCC formation reaction (at 49 min in second stage). Examples 4 and 6 had essentially the same profile.

The Example 4-6 products, as well as three prior art calcium carbonate products for comparison, were tested for various properties according to the methods described above with the results summarized in Table 6.

TABLE 6

R-PCC Characteristics

| Example | BCC milling | MPS, μm | Primary Particle Size, μm | Light Scattering Coefficient |
|---|---|---|---|---|
| 4 | none | 2.06 | 1-2.5 | 150.7 |
| 5 | mild | 1.10 | 0.35-0.6 | 164.6 |
| 6 | strong | 0.79 | 0.25-0.4 | 153.1 |
| Prior art: Covercarb ® GCC | — | 0.65 | | 147.8 |
| Prior art: CS-40, s-PCC | — | 0.4 | | 123.6 |
| Prior art: Albagloss S ® r-PCC | — | 0.6 | | 158.0 |

Covercarb GCC is available from Omya Corporation, Proctor, VT
CS-40 s-PCC is available from J. M. Huber Corporation, Copenhagen, Denmark
Albaglos S r-PCC is available from SMI, New York, NY As can be seen in Table 6, r-PCC material prepared according to the present invention, from milled BCC material, performed better than the prior art and control calcium carbonate material which did not have an intermediate BCC milling step. Indeed, the r-PCC prepared according to the present invention with "mild" milling had a higher light scattering coefficient than any of the other calcium carbonate materials. The r-PCC prepared according to the present invention with "severe" milling had a higher light scattering coefficient than all of the other calcium carbonate materials, with the exception of the Albagloss r-PCC material. Surprisingly, the r-PCC prepared from milled BCC was less than half the size of the r-PCC prepared from the un-milled BCC.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method for forming calcium carbonate comprising the steps of:
    (a) milling calcium hydroxide to a median particle size of less than 5 microns;
    (b) providing a reactor vessel containing a slurry of the milled calcium hydroxide;
    (c) carbonating the slurry of the milled calcium hydroxide by introducing carbon dioxide into the reactor vessel to form basic calcium carbonate by a precipitation reaction, wherein the initial reaction temperature is from about 8° C. to about 15° C.; and
    (d) carbonating the basic calcium carbonate by introducing carbon dioxide into the reactor vessel to form rhombohedral calcium carbonate by a precipitation reaction.

2. The method according to claim 1, wherein the calcium hydroxide is milled to less than 5 μm.

3. The method according to claim 1, wherein the calcium hydroxide is milled to less than 3 μm.

4. The method according to claim 1, wherein the calcium hydroxide is milled to less than 2 μm.

5. The method according to claim 1 wherein the basic precipitated calcium carbonate formed in step (c) has a primary particle size of about 0.2 μm to about 0.8 μm.

6. The method according to claim 1 wherein the rhombohedral calcium carbonate formed in step (d) has a particle size of about 0.2 μm to about 1 μm.

7. The method according to claim 2 wherein the rhombohedral precipitated calcium carbonate formed in step (d) has a particle size distribution as measured by the 75%/25% particle size distribution slope of about 1.6 μm to about 1.8 μm.

* * * * *